UNITED STATES PATENT OFFICE.

HENRY R. BLOOMFIELD, OF NEW YORK, N. Y., ASSIGNOR, BY DIRECT AND MESNE ASSIGNMENTS, TO LIQUID CLEANING STIMULANT CO. INC., OF NEW YORK, N. Y., A CORPORATION OF NEW YORK.

FILTERING AND CLEANSING COMPOSITION.

1,396,244.      Specification of Letters Patent.      Patented Nov. 8, 1921.

No Drawing.      Application filed July 26, 1919. Serial No. 313,657.

*To all whom it may concern:*

Be it known that I, HENRY R. BLOOMFIELD, a citizen of the United States, and a resident of the borough of Manhattan, in the city, county, and State of New York, have invented certain new and useful Improvements in a Filtering and Cleansing Composition, of which the following is a specification.

The present invention relates to a composition of matter, particularly for filtering and cleansing purposes and has for an object to provide a substance of this character which will be relatively simple and inexpensive to produce, and which will constitute an effective filtering and cleansing medium for the purification and cleansing of liquid, semi-liquid and other substances capable of passing through a filter, the substance as will hereinafter appear, being especially desirable for the filtering and cleansing of used oils, either vegetable or mineral, restoring such oils to their original state and in some cases to a quality superior to the original oil. The composition is also adapted to the filtering of other liquid substances such as alcoholic extracts, syrups, molasses, vinegar, beer, wines, water, etc.

Further objects are to provide such a substance which will maintain its porosity and permeability under all conditions of use, the same being such that it will not pack into a solid paste-like substance when mixed with a liquid, and at the same time, the interstices between the particles forming the substance, are of such fineness that the most minute foreign matter will be removed from the liquid passing therethrough. A still further object is to provide such a composition formed from organic substances.

The composition as I prefer to make it, consists of a mixture of vegetable parchment or similar paper ground to a degree of fineness, having the consistency of powder, blossom or moss pollen or spores such for instance as Lycopodium dried peat reduced to a powdered state, and carbonized or heated to such state that it will not color the liquid in which it is placed, and Irish or Iceland moss.

In preparing the paper, the same is first reduced to a finely divided state and is then treated by nitric acid which removes the binding substances therefrom and breaks up the fibers so that they will not adhere or cake together, and then by suitable grinding processes, the fibrous substance thus produced, is finely comminuted. These paper particles which are of powdery consistency have very minute hairy projections or protuberances, and when mixed with the pollen, the interstices between the particles will be maintained and the composition will be prevented from forming a solid pasty substance, and will be maintained porous and permeable, the porosity being of such fineness, however, that the smallest particles are removed from the liquids passing therethrough. The pollen which is unaffected by moisture, will in addition to preventing adherence and caking of the particles, cause the substance to settle in the liquid forming thereby a filter bed.

The powdered peat mixed into the composition, acts as a clarifying agent, and may in some cases be omitted. The Irish or Iceland moss has the property of absorbing water from the liquid being cleansed, and also clarifies it.

Original oil contains a certain amount of carbon and as the same becomes heated during use, the carbon particles are burnt and these burnt particles are of such fineness that they cannot be removed by any of the previously known filtering processes. With my composition, these particles are effectively removed, the minute hairy structure of the particles preventing their penetration through the filter.

In preparing the composition, I prefer to mix the ingredients in substantially the following proportions:

| | |
|---|---|
| Powdered paper fiber | 80% |
| Pollen | 5% |
| Peat | 5% |
| Moss | 5% |

In using the composition, a liquid to be cleansed is placed in a vessel, and a certain quantity of the composition is stirred into the same, settling to the bottom of the vessel, where it forms a filter bed. The liquid is then forced through the same either by pressure or by vacuum and from time to time, additional quantities of the composition may be added if desired. Notwithstanding the very small cost of the composition as compared to the value of the cleansed liquid, it is unnecessary to use a new supply of the same for every cleansing operation. The filter may be repeatedly used and furthermore admits of being cleansed of the solids removed from the liquids, whereupon it may be again used with the same effect as the original composition.

My improved composition is inexpensive, its preparation in large quantities is entirely practical, the substances entering into the composition are readily obtainable and the same possesses to a very high degree the properties and advantages intended from its use.

It will be understood that other analogous substances having substantially similar properties and characteristics, may be employed in the preparation of the composition in substitution of the particular ingredients above referred to within the spirit and scope of my invention as defined in the appended claims.

I claim:

1. A composition of the character described, comprising a fibrous substance, and pollen adapted to maintain the permeability of the composition.

2. A composition of the character described, comprising paper reduced to a substantially powdered state and having tough and elastic fibers, and a moisture repellent substance intermixed with said paper and adapted to maintain the permeability of the composition.

3. A composition of the character described, comprising paper reduced to a substantially powdered state and pollen intermixed with said paper and adapted to maintain the permeability of the composition.

4. A composition of the character described, comprising tough and elastic vegetable fibers reduced to a finely comminuted state, and a substance intermixed therewith adapted to maintain the permeability of the composition.

5. A composition of the character described, comprising vegetable fibers reduced to a finely comminuted state, particles thereof having minute hairy protuberances extending therefrom, and a substance intermixed therewith adapted to maintain the permeability of the composition.

6. A composition of the character described, comprising a fibrous substance reduced to a finely comminuted state and pollen adapted to maintain the permeability of the composition.

7. A composition of the character described, comprising a tough, hairy and elastic fibrous substance reduced to a finely comminuted state, and a vegetable substance repellent to moisture intermixed with said finely comminuted substance, and adapted to maintain the permeability of the composition.

8. A composition of the character described, comprising a fibrous substance reduced to a finely comminuted state, a moisture repellent substance adapted to maintain the permeability of the composition and peat reduced to a finely comminuted state.

9. A composition of the character described, comprising a fibrous substance reduced to a finely comminuted state, and spores reduced to a finely comminuted state, and adapted to absorb moisture.

10. A composition of the character described, comprising paper fibers reduced to a finely comminuted state, pollen, and peat reduced to a finely comminuted state.

11. A composition of the character described, comprising paper fibers reduced to a finely comminuted state, pollen, and moss reduced to a finely comminuted state.

12. A composition of the character described, comprising paper fibers reduced to a finely comminuted state, pollen, peat reduced to a finely comminuted state, and moss reduced to a finely comminuted state.

In testimony that I claim the foregoing as my invention, I have signed my name hereunder.

HENRY R. BLOOMFIELD.